Aug. 30, 1932. M. E. ANDERSON 1,874,022
INDEXING ATTACHMENT FOR AUTOMATIC MACHINES
Filed July 1, 1930 4 Sheets-Sheet 1

INVENTOR
MARTIN E. ANDERSON
BY
ATTORNEY

Aug. 30, 1932.  M. E. ANDERSON  1,874,022
INDEXING ATTACHMENT FOR AUTOMATIC MACHINES
Filed July 1, 1930   4 Sheets-Sheet 3

INVENTOR
*MARTIN E. ANDERSON*
BY
ATTORNEY

Aug. 30, 1932. M. E. ANDERSON 1,874,022

INDEXING ATTACHMENT FOR AUTOMATIC MACHINES

Filed July 1, 1930 4 Sheets-Sheet 4

INVENTOR
MARTIN E. ANDERSON
BY
ATTORNEY

Patented Aug. 30, 1932

1,874,022

UNITED STATES PATENT OFFICE

MARTIN E. ANDERSON, OF WATERBURY, CONNECTICUT, ASSIGNOR TO THE BRISTOL COMPANY, OF WATERBURY, CONNECTICUT, A CORPORATION OF CONNECTICUT

INDEXING ATTACHMENT FOR AUTOMATIC MACHINES

Application filed July 1, 1930. Serial No. 465,108.

The invention relates to the operation of automatic machines, more particularly of the automatic lathe or screw machine type wherein various operations are automatically performed on work held in a suitable rotatable head. The invention has for its object an attachment for such machines whereby said rotatable head may also be indexed as, for example, for allowing broaching operations to be performed with a single spindle machine.

In carrying out the invention, the usual work spindle of an automatic machine of the nature set forth is arranged to be temporarily disengaged from its driving pulley and to be angularly moved by suitable cam-actuated means operated intermittently by cams driven from the driving mechanism which normally rotates said spindle.

The nature of the invention, however, will best be understood when described in connection with the acompanying drawings, in which.

Figure 1:
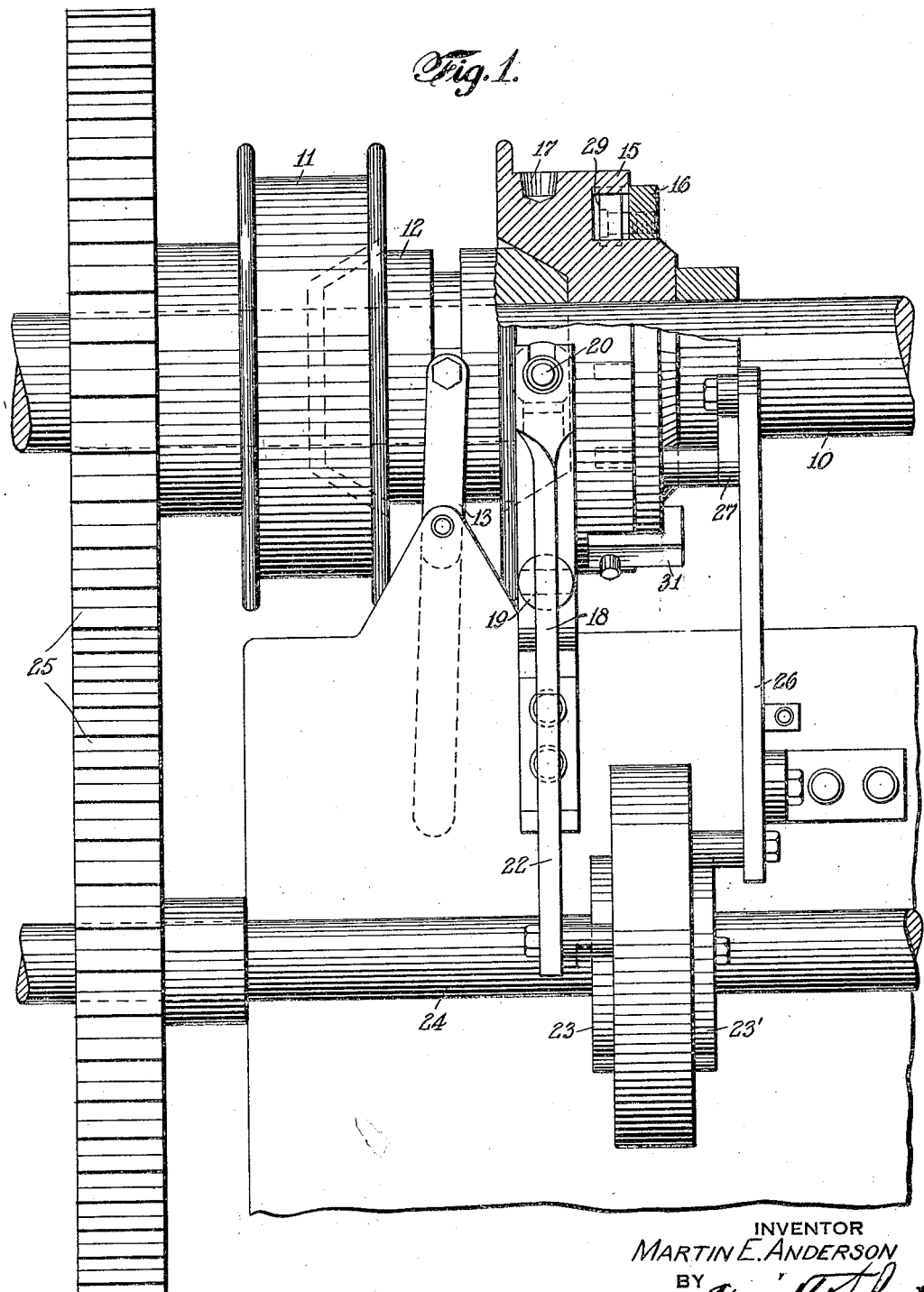
Fig. 1 is a front elevation of the novel indexing attachment, with portion shown in section.
Figure 2:
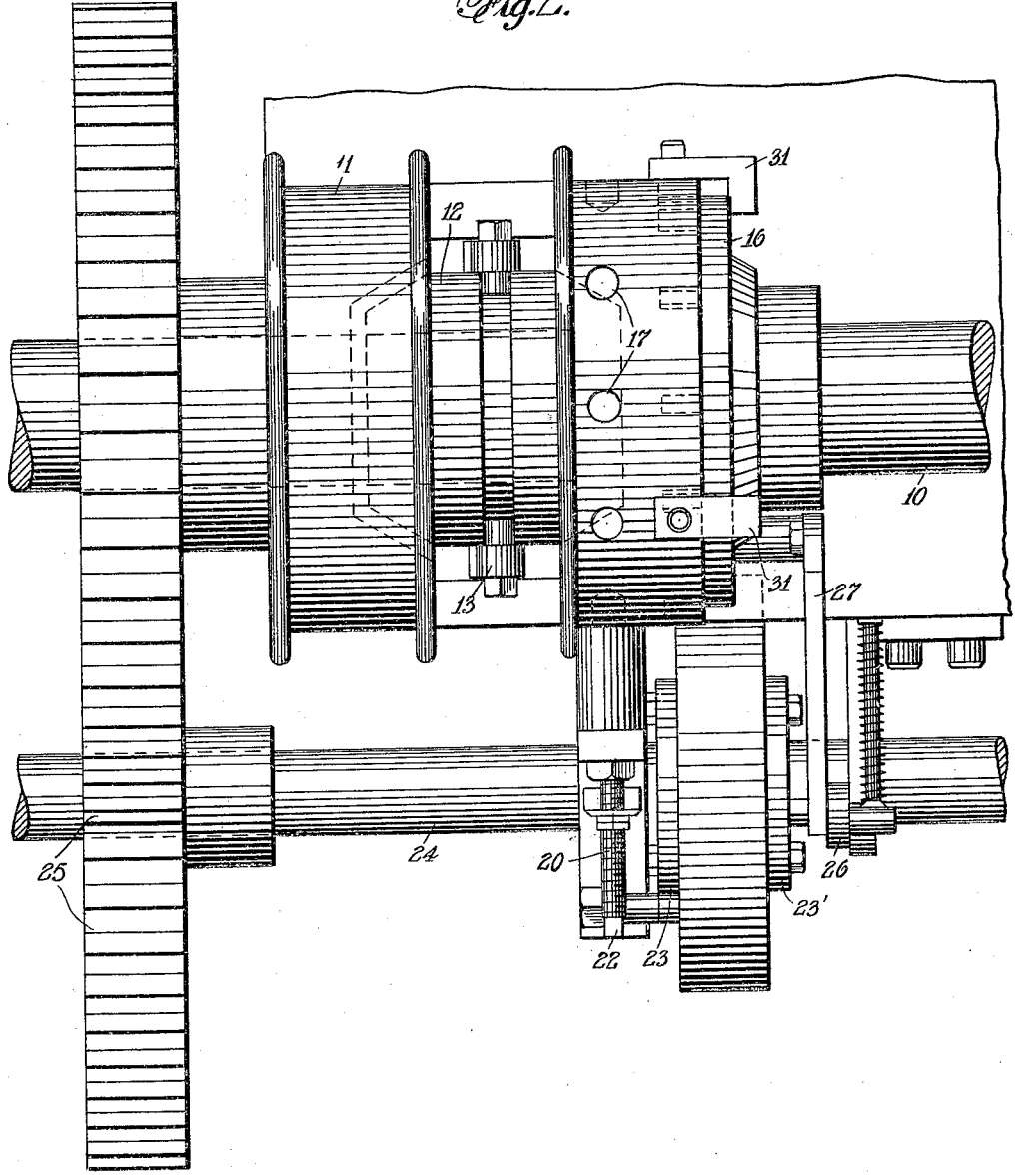
Fig. 2 is a plan thereof.
Figure 3:
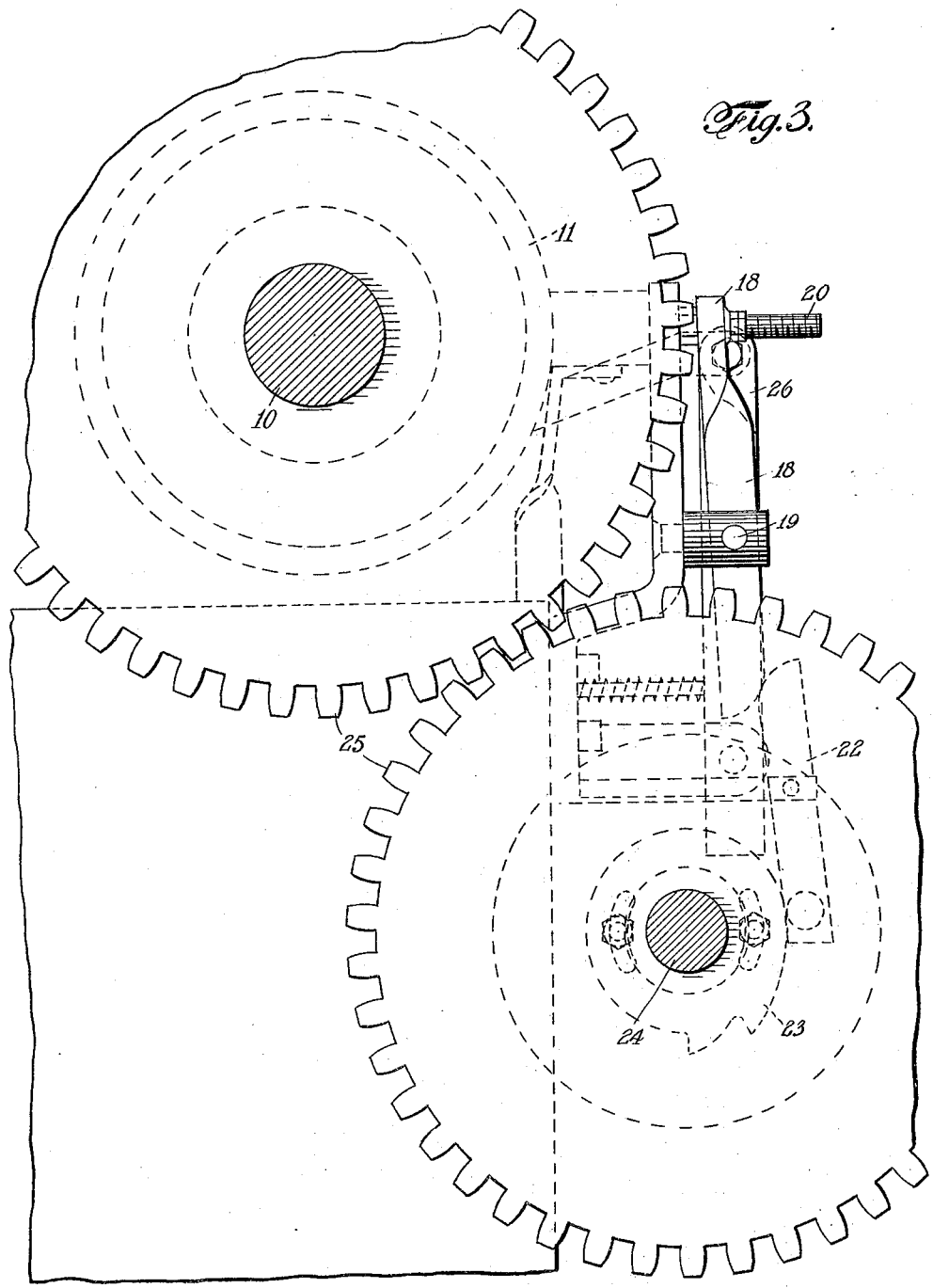
Figs. 3 and 4 are fragmentary elevations of the opposite ends of said mechanism and partly in section.
Figure 4:
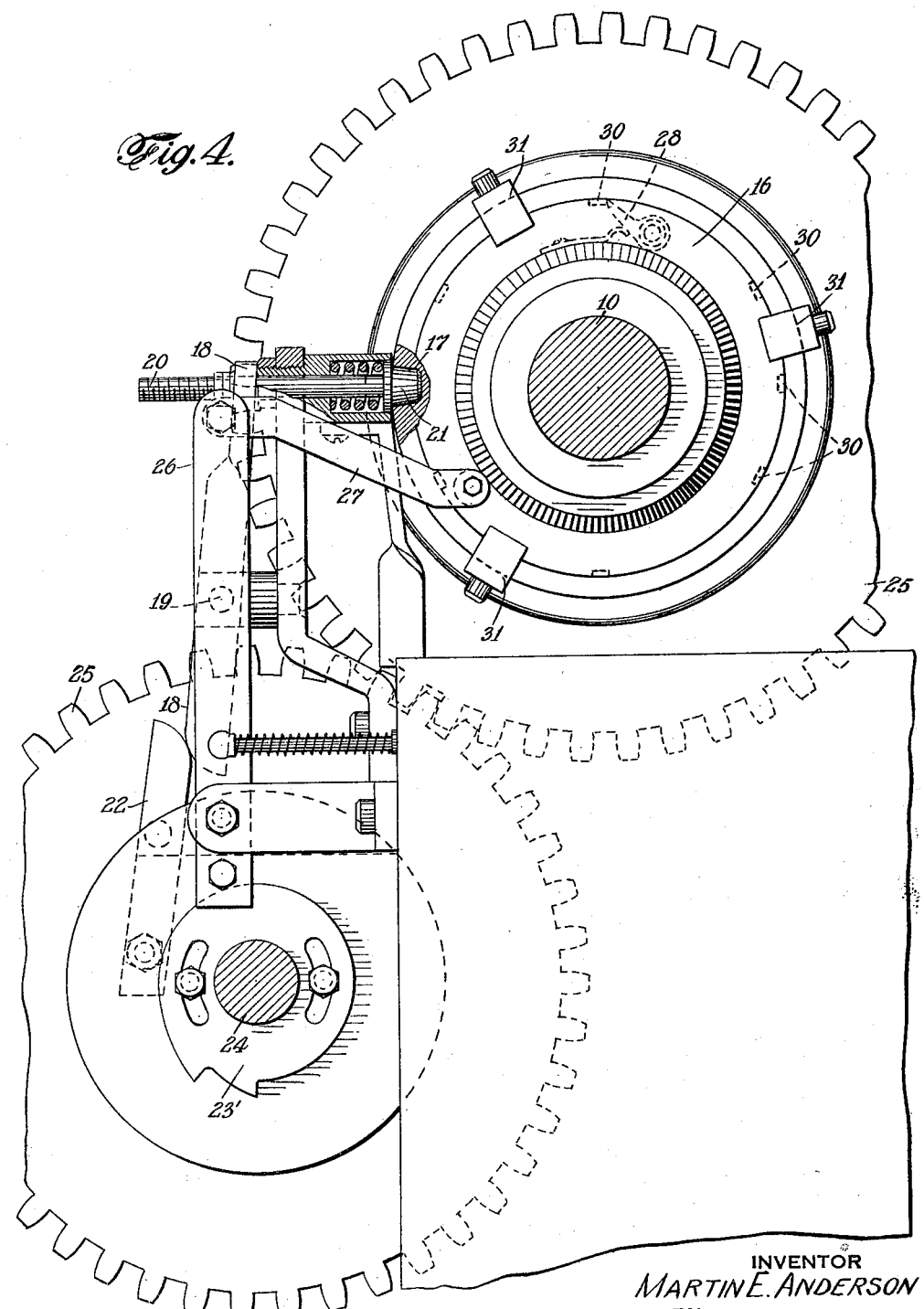

Referring to the drawings, 10 designates the work spindle of an automatic lathe or screw machine and upon which is rotatably mounted a driving pulley 11 therefor, the remaining mechanism and devices of the ordinary automatic machines of this type not being shown; but it is to be understood that the machine embodies these devices and operates in the conventional manner.

The driving pulley 11 operated from the driving shaft of the machine (not shown) is designed to be clutched to the work spindle 10 for driving the same as by means of a clutch member 12 which is also slidable longitudinally thereof and is actuated in well-known manner through a clutch-shifting lever 13. According to the position of the clutch 12, spindle 10 will be rotated or stationary; and the operation of the clutch lever 13 is timed to suit the requirements by the usual mechanism provided in automatic machines and as is well understood.

There is further provided about the said spindle 10 and to be angularly movable thereon a drum or indexing member 15 and in the front face of which is rotatably mounted a projecting ring member 16. Circularly disposed in the periphery of said drum is a series of indexing holes 17 which are suitably spaced to conform to the desired positioning of the work to be held on the spindle 10. For example, six of such holes 60° apart or four 90° apart may be provided to afford correspondingly spaced flutes in an object secured on the spindle, as in a broaching operation. Normally, this head is held against rotation on the spindle 10, the spindle rotating freely relatively thereto for the performance of various operations on the work. However, when the clutch is disengaged from pulley 11 and thrown over for engagement with said drum or indexing member 15, as indicated in Fig. 1, the work spindle 10 is at rest and the indexing operation thereof may then be effected.

To this end, a locking lever 18 fulcrumed at 19 engages the stem 20 of an adjustable spring-urged pin or plunger 21 adapted for engagement with a corresponding socket or indexing hole 17 provided in the periphery of the drum. The opposite arm of lever 18 is wiped by the arm of a further lever 22 having engagement also with a cam 23 which is formed to move the lever 18 in a direction to withdraw the plunger from a socket and thus release the drum 15 for rotation. Cam 23 may rotate with a counter-shaft 24 driven, for example, from the driving pulley 11 through a series of change gears 25 so that the motion of the cam shaft 24 will be timed and conform to the desired operations, as set forth herein.

To effect the angular movement of drum 15, shaft 24 carries a further cam 23′ which, in turn, engages one arm of a spring-drawn lever 26 whose other arm 27 is connected to the ring member 16 to oscillate the same as the lever 26 is correspondingly rocked. There is further carried by the ring member 16 a pawl 28 operating in suitable recesses or slots 29 in the side of the drum 15 adjacently the said ring member for engagement with projections 30 thereof. The ring 16 may be held to said drum in any suitable manner to allow of relative rotation, for example, by means of clamps 31 secured to the latter.

Thereby, as the said ring member is angularly advanced pawl 28 will have engagement with a projection to correspondingly advance the drum which has in the meantime been freed, as hereinbefore set forth, by the action of cam 23. It will be understood, of course, that these cams are so timed as to first release the said drum and then to effect the operation of pawl 28 for advancing the drum, the spindle in the meantime having been disconnected from the pulley through the action of the clutch which at the same time connects the drum to said spindle. Through the operation of the cam shaft 24, therefore, the feeding lever 26—27 indexes the spindle 10 at every position of dwell of the cam, but the said drum is normally locked by means of the locking lever and only released when the lever positions on the dwell of its cam.

I claim:

1. In an automatic machine of the nature set forth comprising a work spindle, driving means therefor including a clutch slidable axially of the spindle: indexing means for said spindle and comprising a drum rotatable on said spindle and adapted to be clutched thereto by the said clutch, means normally restraining said drum from rotation, means to intermittently rotate said drum a predetermined extent, a counter-shaft and gearing intermediate said driving means and counter-shaft for rotating the latter, a pair of cams mounted on the counter-shaft, and mechanism intermediate the respective cams and the restraining means and the intermittent rotating means for effecting the release of the drum and its intermittent rotation to index the spindle.

2. In an automatic machine of the nature set forth comprising a work spindle, driving means therefor including a clutch slidable axially of the spindle: indexing means for said spindle and comprising a drum rotatably mounted on said spindle and adapted to be clutched thereto by the said clutch, a ring carried by said drum and rotatable therein, means carried by said ring for engaging the drum, means normally restraining said drum from rotation, means timed to the rotation of said driving means for releasing the said drum-restraining means, and means timed to the rotation of said driving means for intermittently actuating the ring to advance said drum.

3. In an automatic machine of the nature set forth comprising a work spindle, a driving member rotatable thereon and a clutch slidable axially of the spindle to connect the driving member thereto: indexing means for said spindle and comprising a drum rotatable on said spindle and adapted to be clutched thereto by the said clutch, means normally restraining said drum from rotation, means to intermittently rotate said drum a predetermined extent, a counter-shaft and gearing intermediate the driving member and counter-shaft for continuously rotating the latter, and a pair of cams driven by the counter-shaft for effecting operation respectively of the drum-restraining means to release said drum and of the drum-advancing means to index the spindle.

4. In an automatic machine of the nature set forth comprising a work spindle, a driving member rotatable thereon and a clutch slidable axially of the spindle to connect the driving member thereto: indexing means for said spindle and comprising a drum rotatable on said spindle and adapted to be clutched thereto by the said clutch, a counter-shaft and gearing intermediate the driving member and counter-shaft for continuously rotating the latter, a pair of cams driven by the counter-shaft, a spring-urged plunger adapted to fit sockets in the periphery of the said drum and a lever for controlling the same and actuated by one of the said cams, and pawl-advancing means for engaging the drum to advance the same and a lever for controlling the pawl-advancing means and actuated by the other of said cams.

In testimony whereof I affix my signature.

MARTIN E. ANDERSON.